(12) United States Patent
Hasegawa et al.

(10) Patent No.: US 11,380,967 B2
(45) Date of Patent: *Jul. 5, 2022

(54) STACKED BATTERY

(71) Applicant: TOYOTA JIDOSHA KABUSHIKI KAISHA, Toyota (JP)

(72) Inventors: Hajime Hasegawa, Susono (JP); Norihiro Ose, Sunto-gun (JP); Hideaki Nishimura, Sunto-gun (JP); Yuki Matsushita, Nagoya-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/285,643

(22) Filed: Feb. 26, 2019

(65) Prior Publication Data
US 2019/0319252 A1 Oct. 17, 2019

(30) Foreign Application Priority Data
Apr. 12, 2018 (JP) .............................. JP2018-077156

(51) Int. Cl.
*H01M 50/572* (2021.01)
*H01M 10/04* (2006.01)
(Continued)

(52) U.S. Cl.
CPC ........... *H01M 50/572* (2021.01); *H01M 4/66* (2013.01); *H01M 10/0413* (2013.01); *H01M 10/0562* (2013.01); *H01M 10/0585* (2013.01); *H01M 2200/10* (2013.01); *H01M 2200/20* (2013.01); *H01M 2300/0065* (2013.01)

(58) Field of Classification Search
None
See application file for complete search history.

(56) References Cited

U.S. PATENT DOCUMENTS

| | | | |
|---|---|---|---|
| 2013/0065097 A1* | 3/2013 | Hosaka | H01M 10/0585 429/61 |
| 2016/0351952 A1* | 12/2016 | Ohtomo | H01M 10/0562 |

(Continued)

FOREIGN PATENT DOCUMENTS

| | | |
|---|---|---|
| JP | 2001-068156 A | 3/2001 |
| JP | 2015-018710 A | 1/2015 |

(Continued)

*Primary Examiner* — Carmen V Lyles-Irving
(74) *Attorney, Agent, or Firm* — Oliff PLC

(57) ABSTRACT

In the stacked battery, a short-circuit current shunt part is electrically connected to the electric elements, and an insulating layer of the short-circuit current shunt part is constituted of material having a predetermined melting point or glass transition temperature. When heat is excessively generated in the battery due to internal short circuits etc. and the temperature of the battery reaches the melting point of the insulating layer, the insulating layer melts and its shape is changed to short-circuit the short-circuit current shunt part, and current flows from the electric elements into the short-circuit current shunt part. To measure the current flowing into the short-circuit current shunt part makes it possible to easily grasp excessive heat generation of the battery to suppress deterioration of the battery due to heat generation.

8 Claims, 9 Drawing Sheets

(51) Int. Cl.
*H01M 10/0585* (2010.01)
*H01M 4/66* (2006.01)
*H01M 10/0562* (2010.01)

(56) References Cited

U.S. PATENT DOCUMENTS

2018/0294470 A1  10/2018  Hasegawa et al.
2019/0214677 A1* 7/2019  Yamada ................ H01M 2/145

FOREIGN PATENT DOCUMENTS

| | | |
|---|---|---|
| JP | 2015-138641 A | 7/2015 |
| JP | 2018-041572 A | 3/2018 |
| JP | 2018-181461 A | 11/2018 |

* cited by examiner

STACKED BATTERY

FIELD

The present application discloses a stacked battery.

BACKGROUND

High temperature of a battery may lead to deterioration of battery performance as disclosed in Patent Literature 1. That is, it is preferable to suppress heat generation of a battery as much as possible, and to make it possible to easily grasp heat generation even if heat is generated inside a battery.

On the other hand, a nail penetration test of running and penetrating a conductive nail through a battery, and observing a temperature increase etc. when internal short circuits occur inside an electric element is known as a test for evaluating safety of a battery. For measures for nail penetration through the battery, Patent Literature 2 discloses a battery provided with a short-circuiting and heat radiation accelerating unit that is formed by arranging two metal plates via an insulator, on the outermost layer of an electric element. Patent Literature 3 discloses a battery provided with a preceding short circuit layer between a battery case and an electric element. In Patent Literatures 2 and 3, the short-circuiting and heat radiation accelerating unit or the preceding short circuit layer is short-circuited prior to the electric element in nail penetration through the battery, and discharge of the electric element is advanced before the electric element short-circuits, which results in suppression of heat generation inside the battery.

CITATION LIST

Patent Literature

Patent Literature 1: JP 2018-041572 A
Patent Literature 2: JP 2001-068156 A
Patent Literature 3: JP 2015-018710 A

SUMMARY

Technical Problem

In a stacked battery, a plurality of electric elements each including a cathode current collector layer, a cathode material layer, an electrolyte layer, an anode material layer, and an anode current collector layer are stacked. It is imagined that heat generation inside such a stacked battery including a plurality of electric elements can be grasped by monitoring the voltage of the battery. However, it is difficult to grasp deterioration of the battery due to heat generation in the early stage in general voltage monitoring because deterioration is imagined to be hard to be reflected on the monitored voltage unless the battery badly deteriorates due to heat generation. It is also considered to provide a temperature monitoring mechanism for each electric element that composes the stacked battery, to directly detect heat generation inside the battery. However, it is difficult to provide a temperature monitoring mechanism for every electric element. Even if a temperature monitoring mechanism can be provided for every electric element, the temperature of the whole of the electric elements is hard to be accurately measured, and local heat generation inside the battery might not be able to be grasped.

From the techniques disclosed in Patent Literatures 2 and 3, it seems that current (rounding current) from electric elements is allowed to flow into a short-circuit current shunt part (a part that causes a short-circuit current to divide and flow thereinto when electric elements and the short-circuit current shunt part short-circuit) to advance discharge of the electric elements, to make it possible to suppress heat generation inside the battery, by providing the short-circuit current shunt part including a conducting layer and an insulating layer in the stacked battery, separately from the electric elements, and short-circuiting the short-circuit current shunt part first when stress such as nail penetration is applied (FIG. 9A). Such a problem is easy to arise from the stacked battery in which a plurality of the electric elements are stacked that when electric elements are short-circuited by application of stress such as nail penetration, current flows from some electric elements into the other electric elements, which results in a local temperature increase in some electric elements. For this, it is believed it can be prevented that only the temperature of some electric elements locally rises by providing the short-circuit current shunt part separately from the electric elements, and short-circuiting both some electric elements and the short-circuit current shunt part when stress such as nail penetration is applied to shunt a rounding current from the electric elements of a higher shunt resistance to not only the electric elements of a lower shunt resistance but also the short-circuit current shunt part, which has a low shunt resistance (FIG. 9B). However, there is a case where internal short circuits of the battery occur without any application of stress. In this case, the short-circuit current shunt part still does not short-circuit, it is hard for a rounding current to flow into the short-circuit current shunt part, and current may concentrate in electric elements that short-circuit thereinside, to generate heat.

Solution to Problem

The present application discloses, as one means for solving the problem, a stacked battery comprising a stack that comprises at least one short-circuit current shunt part and a plurality of electric elements which are stacked, and a constraining member that applies a constraint pressure to the stack, wherein the short-circuit current shunt part comprises a first current collector layer, a second current collector layer, and an insulating layer provided between the first and second current collector layers, all of these layers being stacked, each of the electric elements comprises a cathode current collector layer, a cathode material layer, an electrolyte layer, an anode material layer, and an anode current collector layer, all of these layers being stacked, the first current collector layer is electrically connected with the cathode current collector layer, the second current collector layer is electrically connected with the anode current collector layer, the constraining member applies the constraint pressure at least to the short-circuit current shunt part in a direction of stacking the layers in the short-circuit current shunt part, and a melting point or a glass transition temperature of material that constitutes the insulating layer of the short-circuit current shunt part is higher than a temperature at which the battery can be normally used, and lower than a temperature at which the battery deteriorates.

The stacked battery of this disclosure is preferably a sulfide solid-state battery. That is, preferably, the electrolyte layer that is a component of the electric elements is a solid electrolyte layer, and this solid electrolyte layer contains a sulfide solid electrolyte.

When the stacked battery of this disclosure is a sulfide solid-state battery, the electrolyte layer preferably contains $Li_2S$—$P_2S_5$—$LiI$—$LiBr$ as a sulfide solid electrolyte.

In the stacked battery of this disclosure, the constraint pressure that the constraining member applies is preferably no less than 7.5 MPa.

In the stacked battery of this disclosure, the material that constitutes the insulating layer is preferably polyethylene.

In the stacked battery of this disclosure, preferably, a plurality of the electric elements are electrically connected with each other in parallel.

In the stacked battery of this disclosure, the following directions are preferably the same: the direction of stacking the first current collector layer, the insulating layer, and the second current collector layer in the short-circuit current shunt part, a direction of stacking the cathode current collector layer, the cathode material layer, the electrolyte layer, the anode material layer, and the anode current collector layer in each of the electric elements, a direction of stacking the short-circuit current shunt part and the electric elements in the stack, and a direction of applying the constraint pressure to the stack by the constraining member.

Advantageous Effects

In the stacked battery of this disclosure, an insulating layer composing a short-circuit current shunt part is constituted of material having a predetermined melting point or glass transition temperature. When heat is generated in the battery due to internal short circuits etc. and the temperature of the battery reaches the melting point of the insulating layer, the insulating layer melts, and changes its shape due to a constraint pressure, a first current collector and a second current collector are in contact with each other to short-circuit the short-circuit current shunt part, and current flows from electric elements into the short-circuit current shunt part. To measure the current flowing into the short-circuit current shunt part makes it possible to easily grasp heat generation inside the battery, and to suppress deterioration of the battery due to heat generation. In addition, it can be expected to suppress heat generation of the electric elements by passing current through the short-circuit current shunt part to properly discharge the electric elements. Further, it can be expected that a case where battery materials are exposed to high temperature in a high SOC state is easy to be avoided and acceleration of a temperature increase inside the battery is suppressed.

BRIEF DESCRIPTION OF DRAWINGS

FIG. 2A is an external perspective view; and FIG. 2B is a cross-sectional view taken along the line IIB-IIB of FIG. 2A;

FIG. 3A shows a state where the battery is normally used; and FIG. 3B shows a state where heat is generated in the battery due to internal short circuits etc. and an insulating layer 13 melts;

FIG. 4A is an external perspective view; and FIG. 4B is a cross-sectional view taken along the line IVB-IVB of FIG. 4A;

DETAILED DESCRIPTION OF EMBODIMENTS

1. Stacked Battery 100

Figure 1:
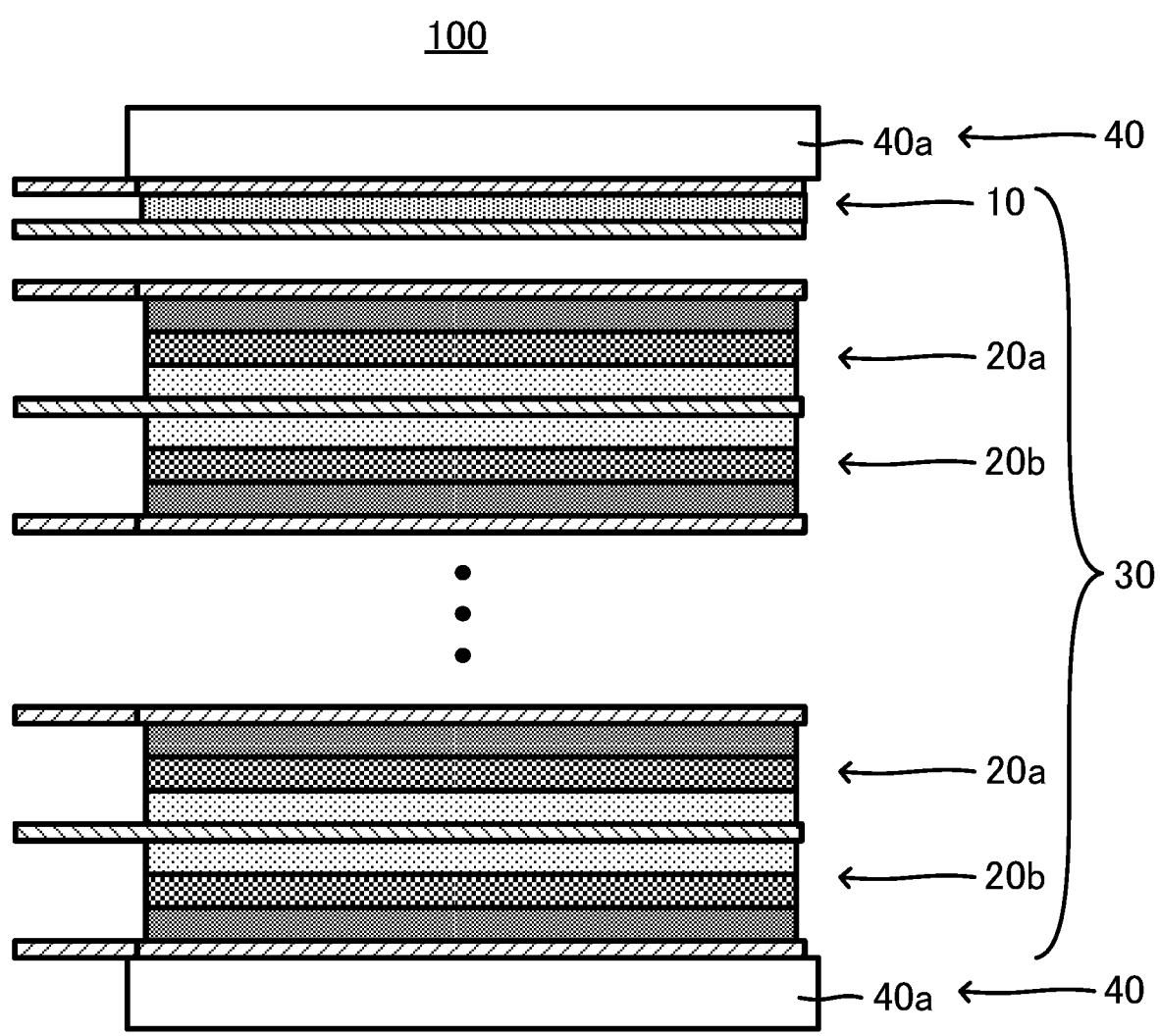
FIG. 1 is an explanatory schematic view of structure of layers of a stacked battery 100.
Figure 2A:
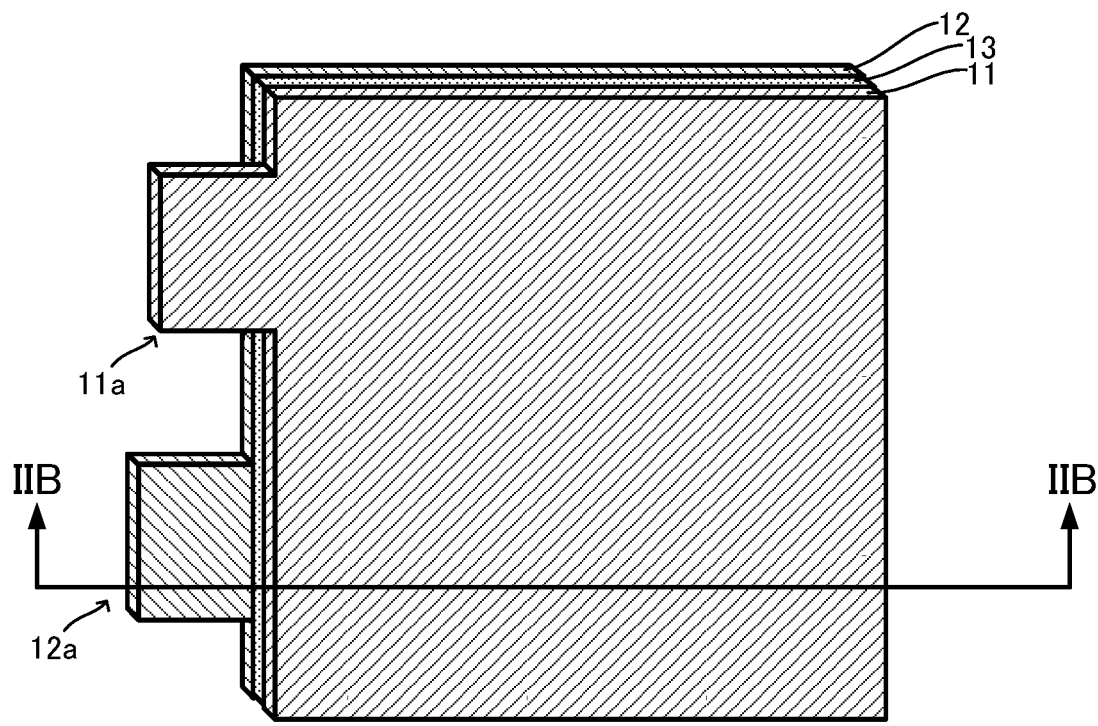
FIGS. 2A and 2B are explanatory schematic views of structure of layers of a short-circuit current shunt part 10.
Figure 2B:
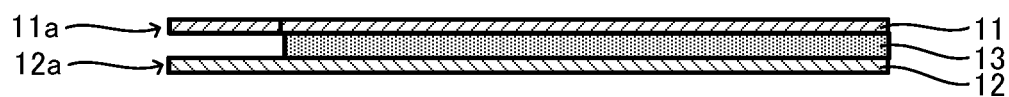
Figure 3A:
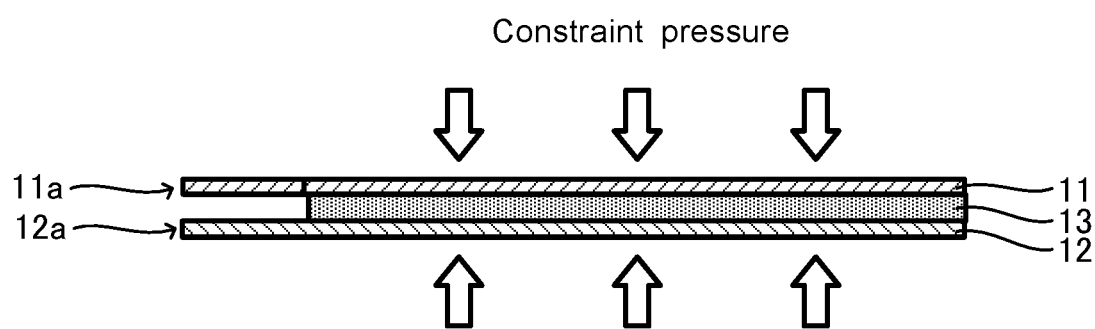
FIGS. 3A and 3B are explanatory schematic views for function of the short-circuit current shunt part 10.
Figure 3B:
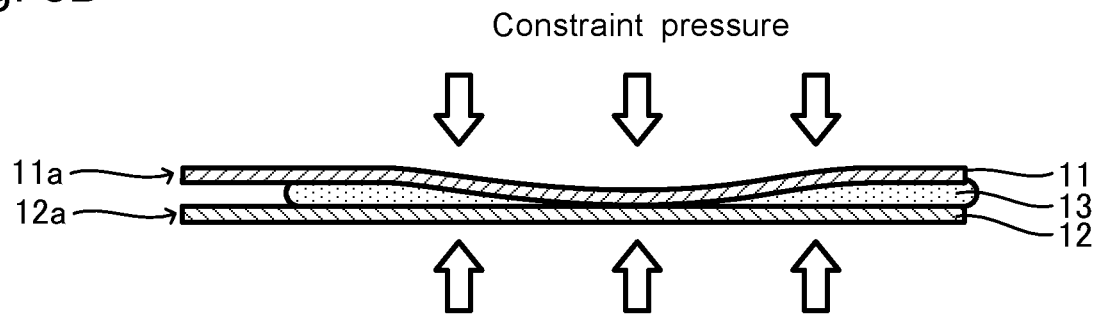
Figure 4A:
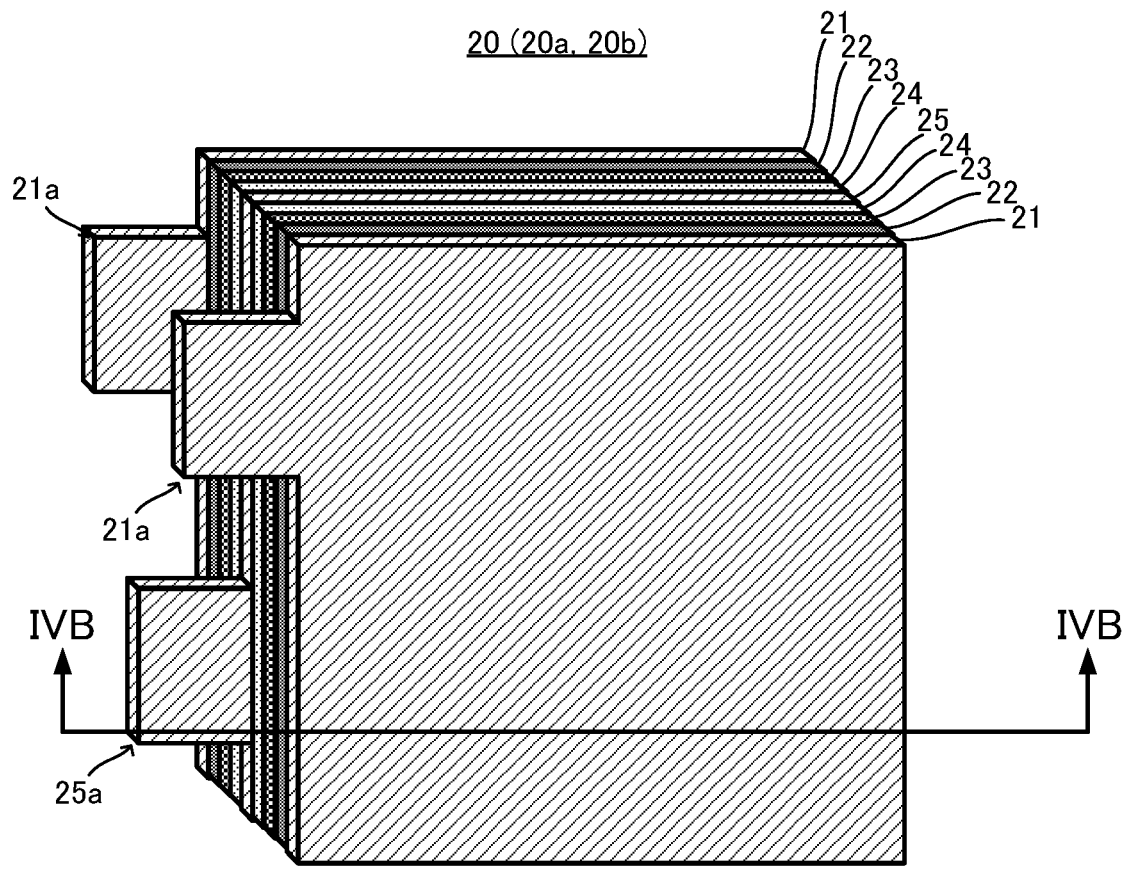
FIGS. 4A and 4B are explanatory schematic views of structure of layers of electric elements 20.
Figure 4B:
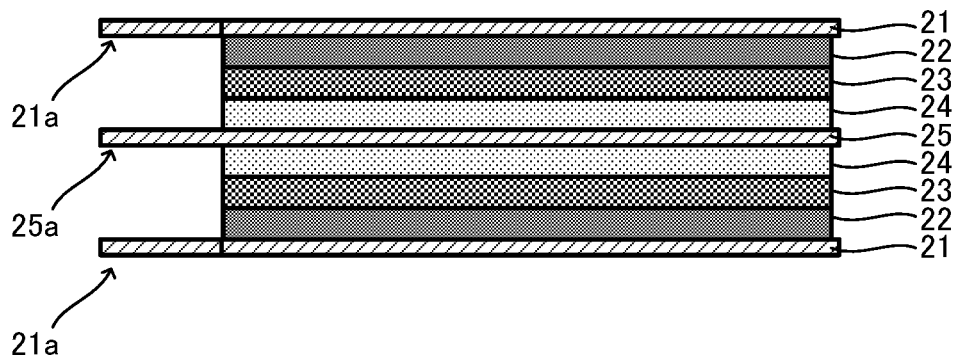

FIG. 1 schematically shows structure of layers of a stacked battery 100. In FIG. 1, portions where current collector layers (current collector tabs) are connected to each other, a battery case, etc. are omitted for convenient explanation. FIGS. 2A and 2B schematically show structure of layers of a short-circuit current shunt part 10 that is a component of the stacked battery 100. FIG. 2A is an external perspective view and FIG. 2B is a cross-sectional view taken along the line IIB-IIB of FIG. 2A. FIGS. 3A and 3B show function of the short-circuit current shunt part 10. FIG. 3A shows a state of the short-circuit current shunt part 10 when the battery is normally used and FIG. 3B shows a state of the short-circuit current shunt part 10 when heat is generated in the battery due to internal short circuits etc. FIGS. 4A and 4B schematically show structure of layers of electric elements 20 that are components of the stacked battery 100. FIG. 4A is an external perspective view and FIG. 4B is a cross-sectional view taken along the line IVB-IVB of FIG. 4A.

As shown in FIGS. 1 to 4B, the stacked battery 100 includes a stack 30 including at least one short-circuit current shunt part 10 and a plurality of the electric elements 20 (electric elements 20a and 20b) which are stacked, and a constraining member 40 that applies a constraint pressure to the stack 30. In the short-circuit current shunt part 10, a first current collector layer 11, a second current collector layer 12, and an insulating layer 13 that is provided between the first current collector layer 11 and the second current collector layer 12 are stacked. In each of the electric elements 20, a cathode current collector layer 21, a cathode material layer 22, an electrolyte layer 23, an anode material layer 24, and an anode current collector layer 25 are stacked. In the stacked battery 100, the first current collector layer 11 is electrically connected with the cathode current collector layer 21, and the second current collector layer 12 is electrically connected with the anode current collector layer 25. Here, a feature of the stacked battery 100 is that the constraining member 40 applies a constraint pressure at least to the short-circuit current shunt part 10 in the direction of stacking the layers 11 to 13 in the short-circuit current shunt part 10, and the melting point or glass transition temperature of material that constitutes the insulating layer 13 of the short-circuit current shunt part 10 is higher than a temperature at which the battery can be normally used, and lower than a temperature at which the battery deteriorates.

1.1. Short-Circuit Current Shunt Part 10

As shown in FIGS. 2A and 2B, the short-circuit current shunt part 10 includes the first current collector layer 11, the second current collector layer 12, and the insulating layer 13 that is provided between the first current collector layer 11 and the second current collector layer 12. In the short-circuit current shunt part 10 having such structure, while the first current collector layer 11 is properly insulated from the second current collector layer 12 via the insulating layer 13 when the battery is normally used as shown in FIG. 3A, the insulating layer 13 melts and changes its shape, and the first current collector layer 11 and the second current collector layer 12 are in contact with each other when heat is generated in the battery due to internal short circuits of the electric elements 20 etc. as shown in FIG. 3B, which leads to a low electric resistance. When stress such as nail penetration is applied, for example, the first current collector layer 11 and the second current collector layer 12 break through the insulating layer 13 and are in contact with each other, to short-circuit the short-circuit current shunt part 10 as well, which makes it possible to shunt a rounding current from the electric elements 20 to the short-circuit current shunt part 10 (see FIGS. 9A and 9B).

1.1.1. First Current Collector Layer 11 and Second Current Collector Layer 12

The first current collector layer 11 and the second current collector layer 12 may be composed of metal foil, a metal mesh, etc., and are especially preferably composed of metal foil. Examples of metal constituting the first current collector layer 11 and the second current collector layer 12 include Cu, Ni, Al, Fe, Ti, Zn, Co, Cr, Au, Pt and stainless steel. The first current collector layer 11 and the second current collector layer 12 may have some layer for adjusting the contact resistance, over their surfaces. The first current collector layer 11 and the second current collector layer 12 may be constituted of either the same metal, or different metals from each other.

The thickness of each of the first current collector layer 11 and the second current collector layer 12 is not specifically limited and for example, is preferably 0.1 m to 1 mm, and is more preferably 1 μm to 100 μm. The thickness thereof within such a range makes it possible to contact the current collector layers 11 and 12 to each other more properly and to more properly short-circuit the short-circuit current shunt part 10 especially when stress such as nail penetration is applied.

As shown in FIGS. 2A and 2B, the first current collector layer 11 includes a current collector tab 11a, and is preferably connected to the cathode current collector layers 21 of the electric elements 20 electrically via the current collector tab 11a. On the other hand, the second current collector layer 12 includes a current collector tab 12a, and is preferably connected to the anode current collector layers 25 of the electric elements 20 electrically via the current collector tab 12a. The material of the current collector tab 11a may be either the same as, or different from that of the first current collector layer 11. The material of the current collector tab 12a may be either the same as, or different from that of the second current collector layer 12.

1.1.2. Insulating Layer 13

The insulating layer 13 may melt when heat is generated in the battery due to internal short circuits of the electric elements etc. while insulating the first current collector layer 11 from the second current collector layer 12 when the battery is normally used. Here, the melting point or glass transition temperature of material that constitutes the insulating layer 13 is higher than the temperature at which the battery can be normally used, and lower than the temperature at which the battery deteriorates. Whereby, in the stage of exceeding the temperature at which the battery can be normally used, the insulating layer 13 melts, and changes its shape due to a constraint pressure by the constraining member 40, which can short-circuit the short-circuit current shunt part 10 (FIG. 3B). At this time, a rounding current flowing from the electric elements 20 into the short-circuit current shunt part 10 is measured, which makes it possible to easily grasp heat generation inside the stacked battery 100, and to suppress deterioration of the electric elements 20 due to heat generation. In addition, passing current through the short-circuit current shunt part 10 in the early stage makes it expectable to suppress heat generation of the electric elements 20. Further, it can be expected that a case where battery materials are exposed to high temperature in a high SOC state is easy to be avoided and acceleration of a temperature increase inside the battery is suppressed.

"Temperature at which the battery can be normally used" is a temperature of the battery when the battery is normally used (normal use mode). There is a case where heat is slightly generated in the battery according to charge and discharge even in the normal use mode when no internal short circuits etc. occur. The insulating layer 13 does not melt in response to such heat generation in the normal use mode. The temperature at which the battery can be normally used varies a little according to a type of the battery. In a case of a battery of an electrolyte solution system, the temperature is generally no more than 60° C., and in a case of a solid-state battery, the temperature is generally no more than 100° C. In order to avoid the insulating layer 13 from melting when the battery is normally used, the melting point or glass transition temperature of material constituting the insulating layer 13 is preferably no less than 105° C., more preferably no less than 110° C., and further preferably no less than 115° C.

"Temperature at which the battery deteriorates" is a temperature at which the battery performance falls to 60% of the initial performance. "Battery performance" is electrochemical performance of materials composing a battery, and is a charge discharge capacity in a case of an active material layer, and ion conductivity in a case of an electrolyte layer. When the stacked battery is a solid-state battery, the battery performance represents ion conductivity of a solid electrolyte. When the stacked battery is a battery of an electrolyte solution system, the battery performance represents power (or resistance) of the battery. Specifically, "temperature at which the battery deteriorates" is measured as follows:

(1) When stacked battery is solid-state battery (1-1) Initial ion conductivity of a solid electrolyte composing the stacked battery is measured;

(1-2) A temperature increasing and decreasing process is performed on this solid electrolyte by means of a heating means (constant temperature oven). Specifically, temperature is increased from a room temperature (20° C.) to a predetermined temperature at an air pressure under an inert atmosphere at 3° C./min in heating rate. After reaching the predetermined temperature, the temperature is kept for 30 minutes, and thereafter is decreased at 2° C./min in cooling rate. The heating and cooling rates are confirmed by, for example, change in temperature of the constant temperature oven;

(1-3) The ion conductivity of the solid electrolyte whose temperature is decreased to the room temperature is measured; and (1-4) A plurality of solid electrolytes of the same kind are prepared to change the maximum temperature reached in the temperature increasing and decreasing process, to identify the reached maximum temperature which makes the ion conductivity fall to 60% of the initial ion conductivity. This identified reached maximum temperature is recorded as "temperature at which the battery deteriorates".

(2) When stacked battery is battery of electrolyte solution system (2-1) The stacked battery just after produced (it is noted that the short-circuit current shunt part is not included) is subjected to charge discharge testing, and the initial power (or resistance) of the battery is measured;

(2-2) A temperature increasing and decreasing process is performed on this stacked battery by means of a heating means (constant temperature oven). Specifically, temperature is increased from a room temperature (20° C.) to a predetermined temperature at an air pressure under an inert atmosphere at 3° C./min in heating rate. Thereafter the predetermined temperature is kept for 30 minutes, and thereafter is decreased at 2° C./min in cooling rate. The heating and cooling rates are confirmed by, for example, change in temperature of the constant temperature oven;

(2-3) After the temperature is decreased to the room temperature, the stacked battery is subjected to charge discharge testing again, and the power (or resistance) of the battery after the temperature increasing and decreasing process is measured; and (2-4) A plurality of the stacked batteries of the same kind are prepared to change the maximum temperature reached in the temperature increasing and decreasing process, to identify the reached maximum temperature which makes the power of the battery fall to 60% of the initial power (or, the reached maximum temperature which makes the resistance of the battery 60% higher than the initial resistance). This identified reached maximum temperature is recorded as "temperature at which the battery deteriorates".

The temperature at which the battery deteriorates varies according to a type of the battery. In a case of a solution based battery, the temperature at which the battery deteriorates is generally no less than 150° C. Thus, when the stacked battery 100 is a solution based battery, the melting point or glass transition temperature of material constituting the insulating layer 13 is preferably no more than 145° C., more preferably no more than 140° C., and further preferably no more than 135° C. When the stacked battery 100 is a sulfide solid-state battery, the temperature at which the battery deteriorates is generally no less than 250° C. Thus, when the stacked battery 100 is a sulfide solid-state battery, the melting point or glass transition temperature of material constituting the insulating layer 13 is preferably no more than 245° C., more preferably no more than 220° C., and further preferably no more than 200° C.

Preferably, the insulating layer 13 melts rapidly when the temperature of the battery exceeds the temperature at which the battery can be normally used. That is, the melting point or glass transition temperature of material constituting the insulating layer 13 is preferably as low as possible. Thus, irrelevantly to the case of a solution based battery or a solid-state battery, the melting point or glass transition temperature of material constituting the insulating layer 13 is preferably no more than 145° C., more preferably no more than 140° C., and further preferably no more than 135° C.

A material that composes the insulating layer 13 may be either an insulating layer constituted of an organic material, or an insulating layer where organic and inorganic materials coexist as long as satisfying the requirements of the melting point or glass transition temperature as described above. Specifically, an insulating layer constituted of an organic material is preferable because being advantageous in view of a low probability of occurrence of short circuits due to cracking in normal use. Examples of an organic material that may constitute the insulating layer 13 include various resins such as various thermoplastic resins having a low melting point or glass transition temperature including polyethylene and polypropylene. As far as the inventors of the present application found out, polyethylene is most preferable among thermoplastic resins. Since polyethylene may melt at 115° C. to 135° C. generally, polyethylene may melt in the early stage in the case of exceeding the temperature at which the battery can be normally used while not melting when the battery is normally used. Polyethylene is not limited to a homopolymer of ethylene, but may be a copolymer of ethylene and another monomer as long as satisfying the requirements of the melting point or glass transition temperature.

The thickness of the insulating layer 13 is not specifically limited, and for example, is preferably 0.1 μm to 1 mm, and is more preferably 1 μm to 100 μm. The thickness of the insulating layer 13 within such a range makes it possible to more properly insulate the first current collector layer 11 from the second current collector layer 12 when the battery is normally used, and makes it possible to more easily contact the first current collector layer 11 and the second current collector layer 12 when the insulating layer 13 melts. The thickness of the insulating layer 13 within such a range also makes it possible to more easily break the insulating layer 13 when stress such as nail penetration is applied, and to more easily contact the first current collector layer 11 and the second current collector layer 12.

1.2. Electric Elements 20 (20a, 20b)

As shown in FIGS. 4A and 4B, the cathode current collector layer 21, the cathode material layer 22, the electrolyte layer 23, the anode material layer 24, and the anode current collector layer 25 are stacked to form each of the electric elements 20. In FIGS. 4A and 4B, the electric elements 20a and 20b can individually function as a single cell.

1.2.1. Cathode Current Collector Layer 21

The cathode current collector layer 21 may be composed of metal foil, a metal mesh, etc., and is especially preferably composed of metal foil. Examples of metal that constitutes the cathode current collector layer 21 include Ni, Cr, Au, Pt, Al, Fe, Ti, Zn and stainless steel. The cathode current collector layer 21 is especially preferably constituted of Al, which has high electric conductivity, in view of output performance. The cathode current collector layer 21 may have some coating layer for adjusting resistance, over its surface, which is, for example, a coating layer containing a conductive material and resin. The thickness of the cathode current collector layer 21 is not limited, and for example, is preferably 0.1 μm to 1 mm, and is more preferably 1 μm to 100 μm.

As shown in FIGS. 4A and 4B, the cathode current collector layer 21 preferably includes a cathode current collector tab 21a at part of an outer edge thereof. The tab 21a makes it possible to electrically connect the first current collector layer 11 and the cathode current collector layer 21 easily, and to electrically connect the cathode current collector layers 21 to each other easily.

1.2.2. Cathode Material Layer 22

The cathode material layer 22 is a layer containing at least an active material. When the stacked battery 100 is a solid-state battery, the cathode material layer 22 may further contain a solid electrolyte, a binder, a conductive additive, etc. optionally, in addition to an active material. When the stacked battery 100 is a battery of an electrolyte solution system, the cathode material layer 22 may further contain a binder, a conductive additive, etc. optionally, in addition to an active material. A known active material may be used. One may select two materials different in electric potential at which predetermined ions are stored/released (charge/discharge potential) among known active materials, to use a material displaying a noble potential as a cathode active material, and a material displaying a base potential as an anode active material described later. For example, when a lithium ion battery is made, any lithium-containing composite oxide such as lithium cobaltate, lithium nickelate, $LiNi_{1/3}Co_{1/3}Mn_{1/3}O_2$, lithium manganate and a spinel lithium compound may be used as the cathode active material. When the stacked battery 100 is a solid-state battery, the surface of the cathode active material may be coated with an oxide layer such as a lithium niobate layer, a lithium titanate layer and a lithium phosphate layer. When the stacked battery 100 is a solid-state battery, a solid electrolyte is preferably an inorganic solid electrolyte because its ion conductivity is high compared with an organic polymer electrolyte. This is also because an inorganic solid electrolyte has a good heat resistance compared with an organic polymer electrolyte. This is also because pressure applied to the electric elements 20 when stress such as nail penetration is applied is high compared to the case using an organic polymer electrolyte, which makes the effect of the stacked battery 100 of the present disclosure outstanding. This is further because an inorganic solid electrolyte is hard and a constraint pressure applied by the constraining member 40 tends to increase compared to the case using an organic polymer electrolyte, to make the effect of the stacked battery 100 of the present disclosure outstanding. Preferred examples of an inorganic solid electrolyte include oxide solid electrolytes such as lithium lanthanum zirconate, LiPON, $Li_{1+x}Al_xGe_{2-x}(PO_4)_3$, Li—SiO based glass and Li—Al—S—O based glass; and sulfide solid electrolytes such as $Li_2S$—$P_2S_5$, $Li_2S$—$SiS_2$, LiI—$Li_2S$—$SiS_2$, LiI—$Si_2S$—$P_2S_5$, $Li_2S$—$P_2S_5$—LiI—LiBr, LiI—$Li_2S$—$P_2S_5$, LiI—$Li_2S$—$P_2O_5$, LiI—$Li_3PO_4$—$P_2S_5$ and $Li_2S$—$P_2S_5$—$GeS_2$. Especially, a sulfide solid electrolyte is preferable, a sulfide solid electrolyte containing $Li_2S$—$P_2S_5$ is more preferable, and a sulfide solid electrolyte containing $Li_2S$—$P_2S_5$—LiI—LiBr is further preferable. Examples of a binder that may be contained in the cathode material layer 22 include butadiene rubber (BR), butyl rubber (IIR), acrylate-butadiene rubber (ABR) and polyvinylidene difluoride (PVdF). Examples of a conductive additive that may be contained in the cathode material layer 22 include carbon materials such as acetylene black and Ketjenblack, and metallic materials such as nickel, aluminum and stainless steel. The contents of the constituents in the cathode material layer 22 may be the same as in a conventional one. The shape of the cathode material layer 22 may be the same as a conventional one as well. Specifically, from the viewpoint that the stacked battery 100 can be easily made, the cathode material layer 22 in the form of a sheet is preferable. In this case, the thickness of the cathode material layer 22 is, for example, preferably 0.1 μm to 1 mm, and more preferably 1 μm to 150 μm.

1.2.3. Electrolyte Layer 23

The electrolyte layer 23 is a layer containing at least an electrolyte. When the stacked battery 100 is a solid-state battery, the electrolyte layer 23 may be a solid electrolyte layer containing a solid electrolyte, and optionally a binder. The solid electrolyte is preferably an inorganic solid electrolyte described above. Especially, when the stacked battery 100 is a sulfide solid-state battery, the electrolyte layer 23 preferably contains a sulfide solid electrolyte. In this case, a sulfide solid electrolyte contained in the electrolyte layer 23 is preferably a sulfide solid electrolyte containing $Li_2S$—$P_2S_5$, and more preferably a sulfide solid electrolyte containing $Li_2S$—$P_2S_5$—LiI—LiBr. The binder same as one used in the cathode material layer 22 may be properly selected to be used. The contents of the constituents in the solid electrolyte layer 23 may be the same as in a conventional one. The shape of the solid electrolyte layer 23 may be the same as a conventional one as well. Specifically, from the viewpoint that the stacked battery 100 can be easily made, the solid electrolyte layer 23 in the form of a sheet is preferable. In this case, the thickness of the solid electrolyte layer 23 is, for example, preferably 0.1 μm to 1 mm, and more preferably 1 μm to 100 μm. On the other hand, when the stacked battery 100 is a battery of an electrolyte solution system, the electrolyte layer 23 contains an electrolyte solution and a separator. These electrolyte solution and separator are obvious for the person skilled in the art, and thus detailed description thereof is omitted here. The electrolyte layer 23 is preferably a solid electrolyte layer. That is, the stacked battery 100 is preferably a solid-state battery, and especially preferably a sulfide solid-state battery. In a sulfide solid-state battery, a constraint pressure by the constraining member 40 tends to be high in order to lower the interface resistance of active materials and a solid electrolyte, and as a result, a constraint pressure applied to the short-circuit current shunt part 10 is high. That is, at high temperature, the shape of the insulating layer 13 is easier to be changed and the short-circuit current shunt part 10 is easier to be short-circuited.

1.2.4. Anode Material Layer 24

The anode material layer 24 is a layer containing at least an active material. When the stacked battery 100 is a solid-state battery, the anode material layer 24 may further contain a solid electrolyte, a binder, a conductive additive, etc. optionally, in addition to an active material. When the stacked battery 100 is a battery of an electrolyte solution system, the anode material layer 24 may further contain a binder, a conductive additive, etc. optionally, in addition to an active material. A known active material may be used. One may select two materials different in electric potential at which predetermined ions are stored/released (charge/discharge potential) among known active materials, to use a material displaying a noble potential as the cathode active material, and a material displaying a base potential as the anode active material. For example, when a lithium ion battery is made, a silicon-based active material such as Si, Si alloys and silicon oxide; a carbon-based active material such as graphite and hard carbon; any oxide-based active material such as lithium titanate; lithium metal or a lithium alloy; or the like may be used as the anode active material. A solid electrolyte, a binder, and a conductive additive may be properly selected from ones that are the examples as those used in the cathode material layer 22, to be used. The contents of the constituents in the anode material layer 24 may be the same as in a conventional one. The shape of the anode material layer 24 may be the same as a conventional one as well. Specifically, from the viewpoint that the stacked battery 100 can be easily made, the anode material layer 24 in the form of a sheet is preferable. In this case, the thickness of the anode material layer 24 is, for example, preferably 0.1 m to 1 mm, and more preferably 1 m to 100 km. Preferably, the thickness of the anode material layer 24 is determined so that the capacity of an anode is larger than that of a cathode.

1.2.5. Anode Current Collector Layer 25

The anode current collector layer 25 may be composed of metal foil, a metal mesh, etc., and is especially preferably composed of metal foil. Examples of metal that constitutes the anode current collector layer 25 include Cu, Ni, Fe, Ti, Co, Zn and stainless steel. The anode current collector layer 25 is especially preferably constituted of Cu. The anode current collector layer 25 may have some coating layer for adjusting resistance, over its surface, which is, for example, a coating layer containing a conductive material and resin. The thickness of the anode current collector layer 25 is not specifically limited, and for example, is preferably 0.1 µm to 1 mm, and is more preferably 1 µm to 100 µm.

As shown in FIGS. 4A and 4B, the anode current collector layer 25 preferably includes an anode current collector tab 25a at part of an outer edge thereof. The tab 25a makes it possible to electrically connect the second current collector layer 12 to the anode current collector layer 25 easily, and to electrically connect the anode current collector layers 25 to each other easily.

1.3. Stack 30

The stacked battery 100 includes the stack 30 that includes at least one short-circuit current shunt part 10 and a plurality of the electric elements 20 which are stacked.

1.3.1. Arrangement of Electric Elements

In the stack 30, the number of stacking the electric elements 20a and 20b is not specifically limited, and may be properly determined according to the power of the battery to be aimed. In this case, a plurality of the electric elements 20 may be stacked either so as to be directly in contact with each other, or via some layers (for example, insulating layers) or spaces (air spaces). In view of improving the power density of the battery, preferably, a plurality of the electric elements 20 are stacked so as to be directly in contact with each other as shown in FIG. 1. As shown in FIGS. 1, 4A and 4B, two electric elements 20a and 20b preferably share the anode current collector layer 25, which further improves the power density of the battery. Further, as shown in FIG. 1, if a plurality of the electric elements are provided in the stacked battery 100, the direction of stacking a plurality of the electric elements 20 is preferably the same as that of stacking the layers 21 to 25 in the electric elements 20, which makes it easy to, for example, constrain the stacked battery 100, to further improve the power density of the battery.

1.3.2. Electric Connection of Electric Elements with Each Other

As shown in FIG. 1, the stacked battery 100 includes a plurality of the electric elements 20. A plurality of the electric elements 20 may be electrically connected either in series or in parallel. Especially preferably, a plurality of the electric elements 20 are electrically connected to each other in parallel. In the electric elements connected in parallel as described above, when one electric element short-circuits, electrons concentratedly flow into the one electric element from the other electric elements. That is, Joule heating is easy to be high when the battery short-circuits. In other words, in the stacked battery 100 including a plurality of the electric elements 20 connected in parallel, the effect of providing the short-circuit current shunt part 10 is more outstanding. A conventionally known member may be used as a member for electrically connecting the electric elements to each other. For example, as described above, one may provide the cathode current collector tabs 21a for the cathode current collector layers 21, and the anode current collector tabs 25a for the anode current collector layers 25, to electrically connect the electric elements 20 to each other in parallel via the tabs 21a and 25a.

1.3.3. Electric Connection of Short-Circuit Current Shunt Part and Electric Elements In the stacked battery 100, the first current collector layer 11 of the short-circuit current shunt part 10 is electrically connected with the cathode current collector layers 21 of the electric elements 20, and the second current collector layer 12 of the short-circuit current shunt part 10 is electrically connected with the anode current collector layers 25 of the electric elements 20. Electric connection of the short-circuit current shunt part 10 and the electric elements 20 like this makes it possible for a rounding current from the electric elements to flow into the short-circuit current shunt part 10 when the short-circuit current shunt part 10 short-circuits. A conventionally known member may be used as a member for electrically connecting the short-circuit current shunt part 10 and the electric elements 20. For example, as described above, one may provide the first current collector tab 11a for the first current collector layer 11, and the second current collector tab 12a for the second current collector layer 12, to electrically connect the short-circuit current shunt part 10 and the electric elements 20 via the tabs 11a and 12a.

1.3.4. Positional Relationship Between Short-Circuit Current Shunt Part and Electric Elements The short-circuit current shunt part 10 and a plurality of the electric elements 20 may be stacked to each other. In this case, the short-circuit current shunt part 10 and a plurality of the electric elements 20 may be either directly stacked, or indirectly stacked via other layers (insulating layers, heat insulating layers, etc.) as long as the problem can be solved. The short-circuit current shunt part 10 may be stacked on an outer side than a plurality of the electric elements 20, may be stacked between a plurality of the electric elements 20, and may be stacked both on an outer side than and between a plurality of the electric elements 20. When a nail penetration test is assumed, as shown in FIG. 1, when the short-circuit current shunt part 10 and a plurality of the electric elements 20 are stacked, the short-circuit current shunt part 10 is preferably provided on an outer side than a plurality of the electric elements 20, and more preferably provided at least on an outer side than a plurality of the electric elements 20 with respect to the stacking direction (direction of stacking the layers in a plurality of the electric elements 20). In other words, in the stacked battery 100, if an external case (not shown) that stores the short-circuit current shunt part 10 and the electric elements 20 is provided, at least one short-circuit current shunt part 10 is preferably provided between the electric elements 20 and the external case. When a nail penetration test is assumed, arrangement of the short-circuit current shunt part 10 on an outer side than the electric elements 20 makes it easy for the short-circuit current shunt part 10 to short-circuit prior to the electric element 20a etc., which makes it possible to generate a rounding current from the electric element 20a etc. to the short-circuit current shunt part 10, and further, to suppress heat generation inside the electric element 20a etc. On the other hand, in view of more rapidly short-circuiting the short-circuit current shunt part 10 for heat generation inside the battery, at least one short-circuit current shunt part 10 is preferably arranged between a plurality of the electric elements 20.

The direction of stacking the layers 11 to 13 and 21 to 25 in the stack 30 is preferably the same as that of a constraint pressure applied by the constraining member 40 in view of, for example, more easily short-circuiting the short-circuit current shunt part 10 when the insulating layer 13 melts, and lowering the internal resistance of the electric elements 20 as described above. This applies to the case where a nail penetration test is assumed as well. That is, short circuits of the battery due to nail penetration are easy to occur when a nail penetrates from the cathode current collector layer 21 toward the anode current collector layer 25 (or from the anode current collector layer 25 toward the cathode current collector layer 21) of the electric element 20a. In this point, in the stacked battery 100, the direction of nail penetration is preferably the same as that of stacking the layers. In view of the above, as shown in FIG. 1, the following directions are preferably the same in the stacked battery 100: the direction of stacking the first current collector layer 11, the insulating layer 13, and the second current collector layer 12 in the short-circuit current shunt part 10, the direction of stacking the cathode current collector layer 21, the cathode material layer 22, the electrolyte layer 23, the anode material layer 24, and the anode current collector layer 25 in each of the electric elements 20, the direction of stacking the short-circuit current shunt part 10 and the electric elements 20, and the direction of applying a constraint pressure by the constraining member 40 to the stack 30.

1.3.5. Relation Between Short-Circuit Current Shunt Part and Electric Elements in Size In the stacked battery 100, the short-circuit current shunt part 10 covers as much part of the electric elements 20 as possible, which makes it possible to melt at least part of the insulating layer 13 in the earlier stage for a temperature increase inside the battery, and to short-circuit the short-circuit current shunt part 10 in the earlier stage. The short-circuit current shunt part 10 covers as much part of the electric elements 20 as possible, which makes it easy to short-circuit the short-circuit current shunt part 10 prior to the electric elements 20 in nail penetration. In view of this, for example, in the stacked battery 100, the outer edges of the short-circuit current shunt part 10 are preferably present on an outer side than those of the electric elements 20 when viewed in the direction of stacking the short-circuit current shunt part 10 and the electric elements 20. Alternatively, when the direction of stacking the short-circuit current shunt part 10 and the electric elements 20 is the same as that of stacking the layers 21 to 25 in the electric elements 20, the outer edges of the short-circuit current shunt part 10 are preferably present on an outer side than those of the cathode material layers 22, the electrolyte layers 23, and the anode material layers 24 when viewed in the direction of stacking the short-circuit current shunt part 10 and the electric elements 20. In this case, preferably, the first current collector layer 11 of the short-circuit current shunt part 10 and the anode current collector layers 25 of the electric elements 20 may not short-circuit. That is, preferably, an insulator or the like is provided between the short-circuit current shunt part 10 and the electric elements 20, so that short circuits of the short-circuit current shunt part 10 and the electric elements 20 can be prevented even if the short-circuit current shunt part 10 is enlarged.

On the other hand, from the viewpoints that the energy density of the battery is improved more, and that short circuits of the short-circuit current shunt part 10 and the electric elements 20 due to their contact as described above can be easily prevented, the short-circuit current shunt part 10 may be as small as possible. That is, in view of them, in the stacked battery 100, the outer edges of the short-circuit current shunt part 10 are preferably present on an inner side than those of the electric elements 20 when viewed in the direction of stacking the short-circuit current shunt part 10 and the electric elements 20. Alternatively, when the direction of stacking the short-circuit current shunt part 10 and the electric elements 20 is the same as that of stacking the layers 21 to 25 in the electric elements 20, the outer edges of the short-circuit current shunt part 10 are preferably present on an inner side than those of the cathode material layers 22, the electrolyte layers 23, and the anode material layers 24 when viewed in the direction of stacking the short-circuit current shunt part 10 and the electric elements 20.

1.4. Constraining Member

The constraining member 40 is to apply a constraint pressure to the stack 30. In the stacked battery 100, it is necessary for the constraining member 40 to apply a constraint pressure at least to the short-circuit current shunt part 10 in the direction of stacking the layers 11 to 13 in the short-circuit current shunt part 10, which causes the first current collector layer 11 and the second current collector layer 12 to be pressed against each other when the insulating layer 13 melts, so that the shape of the insulating layer 13 can be easily changed, to make it possible for the first current collector layer 11 and the second current collector layer 12 to be more properly in contact with each other. Preferred relation between the direction of stacking the layers in the stack 30 and that of a constraint pressure by the constraining member 40 is as described above.

Structure of the constraining member 40 is not specifically limited. For example, as shown in FIG. 1, the screwing constraining member 40 including boardlike parts 40a that hold both end sides of the stacked battery 100 in the stacking direction, a sticklike part (not shown) that couples the boardlike parts 40a, and an adjustment part (not shown) that is coupled to the sticklike part and adjusts a space between the boardlike parts by a screwing structure or the like may be used. In the stacked battery 100 shown in FIG. 1, the structure that the constraining member 40 is directly in contact with the short-circuit current shunt part 10 is provided as an example. However, a manner of installing the constraining member 40 is not restricted to this. The constraining member 40 may be such as to constrain the short-circuit current shunt part 10 and the electric elements 20 via a battery case. Alternatively, the constraining member 40 may be such as to constrain the short-circuit current shunt part 10 and the electric elements 20 via some member other than a battery case.

Alternatively, the constraining member may be such as to constrain the short-circuit current shunt part 10 and the electric elements 20 by pressure from fluid of high pressure, with which the inside of a battery case (space between the short-circuit current shunt part 10, the electric elements 20, and the inner wall of the case) is filled. In this case, fluid that does not cause any unnecessary reaction for battery materials is preferable. Examples thereof include inert gases such as nitrogen, and dry air.

Alternatively, one may arrange a compressed elastic member inside a battery case, and apply a constraint pressure to the short-circuit current shunt part 10 and the electric elements 20 by an expansion force of this elastic member. In this case, examples of the elastic member include a rubber sheet.

A magnitude of a constraint pressure by the constraining member 40 is not specifically limited. From the viewpoint that the first current collector layer 11 and the second current collector layer 12 can be in contact with each other in the earlier stage when the insulating layer 30 melts, a constraint pressure by the constraining member 40 is preferably no less than 0.5 MPa, more preferably no less than 1.5 MPa, and further preferably no less than 7.5 MPa. The upper limit of a constraint pressure is not specifically limited, and for example, is preferably no more than 50 MPa, and is more preferably no more than 30 MPa.

1.5. Function and Effect

Figure 9A:
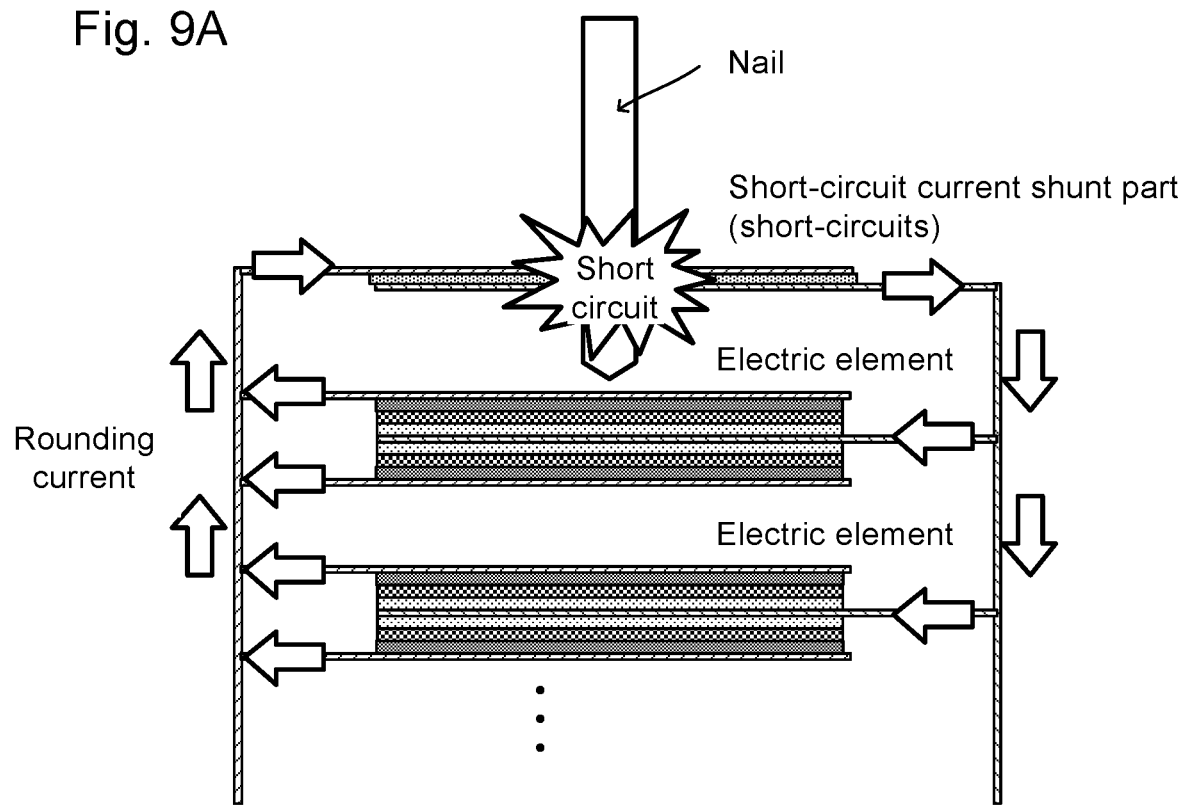
FIGS. 9A and 9B are explanatory schematic views of, for example, a rounding current generated in nail penetration in a stacked battery.
Figure 9B:
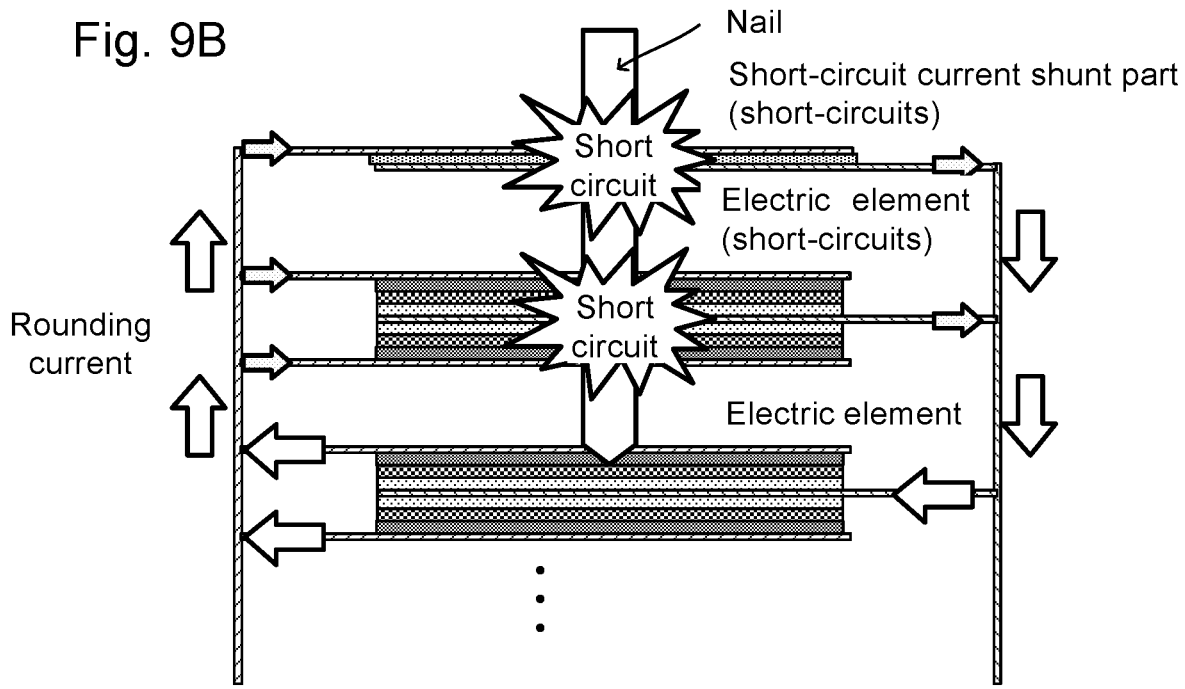

In the stacked battery 100, the short-circuit current shunt part 10 may short-circuit due to application of stress such as nail penetration (see FIGS. 9A and 9B). In addition, the short-circuit current shunt part 10 may short-circuit due to heat generation inside the battery. That is, in the stacked battery 100, since the insulating layer 13 that composes the short-circuit current shunt part 10 is constituted of material having a predetermined melting point or glass transition temperature, the insulating layer 13 melts, and changes its shape due to a constraint pressure by the constraining member 40 when heat is generated in the battery due to internal short circuits etc. and the temperature of the battery reaches the melting point of the insulating layer 13, which causes the first current collector layer 11 and the second current collector layer 12 to be in contact with each other to short-circuit the short-circuit current shunt part 10 (see FIG. 3B), and current to flow from the electric elements 20 into the short-circuit current shunt part 10. In this case, to measure the current flowing into the short-circuit current shunt part 10 makes it possible to easily grasp heat generation inside the battery, and to suppress deterioration of the battery due to heat generation. To pass current through the short-circuit current shunt part 10 to advance discharge of electric elements 20 makes it expectable to suppress heat generation of the electric elements 20. Further, it can be expected that a case of exposing battery materials to high temperature in a high SOC state is easy to be avoided and acceleration of a temperature increase inside the battery is suppressed.

2. Method for Producing Stacked Battery

The short-circuit current shunt part 10 can be easily made by arranging the insulating layer 13 (for example, a thermoplastic resin sheet having a predetermined melting point or glass transition temperature) between the first current collector layer 11 (for example, predetermined metal foil) and the second current collector layer 12 (for example, predetermined metal foil). For example, as shown in FIGS. 2A and 2B, one may arrange the insulating layer 13 over at least one face of the second current collector layer 12, and further arrange the first current collector layer 11 over a face of the insulating layer 13 which is on the opposite side of the second current collector layer 12. Here, the layers of the short-circuit current shunt part 10 may be stuck to each other using adhesive, resin, or the like in order to keep its shape. In this case, it is not necessary for adhesive or the like to be applied all over the faces of the layers, but adhesive or the like may be applied to part of a surface of each layer.

The electric elements 20 can be made by a known method. For example, when a solid-state battery is produced, one may coat the surface of the cathode current collector layer 21 with a cathode material in a wet process to dry the surface, to form the cathode material layer 22, coat the surface of the anode current collector layer 25 with an anode material in a wet process to dry the surface, to form the anode material layer 24, transfer the electrolyte layer 23 containing a solid electrolyte etc. between the cathode material layer 22 and the anode material layer 24, and integrally press-mold the layers, which makes it possible to make each of the electric elements 20. A pressing pressure at this time is not limited, and for example, is preferably no less than 2 ton/cm$^2$. These making procedures are just an example, and the electric elements 20 can be made by any procedures other than them. For example, the cathode material layer etc. can be formed by a dry process instead of a wet process.

The short-circuit current shunt part 10 made as described above is stacked onto the electric elements 20. In addition, the tab 11a provided for the first current collector layer 11 is connected with the cathode current collector layers 21, and the tab 12a provided for the second current collector layer 12 is connected with the anode current collector layers 25, which makes it possible to electrically connect the short-circuit current shunt part 10 and the electric elements 20. When a plurality of the electric elements 20 are provided, the tabs 21a of the cathode current collector layers 21 of a plurality of the electric elements 20 are connected with each other, and the tabs 25a of the anode current collector layers 25 thereof are connected with each other, which makes it possible to electrically connect a plurality of the electric elements 20 with each other in parallel. The stack 30 of the short-circuit current shunt part 10 and the electric elements 20 which are electrically connected as described above is, for example, sealed in an external case (battery case) of a laminate film, a stainless steel can, or the like while constrained by the constraining member 40, which makes it possible to make a solid-state battery as the stacked battery. These making procedures are just an example, and a solid-state battery can be made by any procedures other than them.

Alternatively, for example, one may arrange a separator instead of the solid electrolyte layer to make the stack 30 in which electric connection is carried out as described above, and thereafter seal up the stack 30 in an external case (battery case) that is filled with an electrolyte solution while constraining the stack 30 by the constraining member 40, which makes it possible to produce an electrolyte solution-based battery as the stacked battery. When an electrolyte solution based battery is produced, press-molding of the layers may be omitted.

As described above, the stacked battery 100 of the present disclosure can be easily produced by applying a conventional method for producing a battery.

3. Additional Notes

The description showed the embodiment of composing the short-circuit current shunt part of one first current collector layer, one insulating layer, and one second current collector layer. The stacked battery of the present disclosure is not restricted to this embodiment. The short-circuit current shunt part may include some insulating layer between first and second current collector layers, and the number of the layers is not specifically limited.

The description showed the embodiment of providing only one short-circuit current shunt part on the outside with respect to the direction of stacking a plurality of the electric elements in the stacked battery. The number of the short-circuit current shunt parts is not limited to this. A plurality of the short-circuit current shunt parts may be provided outside in the stacked battery. The position of the short-circuit current shunt part is not limited to the outside of the electric elements. The short-circuit current shunt part may be provided between a plurality of the electric elements.

The description showed such an embodiment that two electric elements share one anode current collector layer. The stacked battery of the present disclosure is not restricted to this embodiment. The electric elements may individually function as a single cell where the cathode current collector layer, the cathode material layer, the electrolyte layer, the anode material layer, and the anode current collector layer are stacked. For example, the stacked battery of this disclosure may include either such an embodiment that two electric elements share one cathode current collector layer, or such an embodiment that a plurality of the electric elements do not share any current collector layer, but are individually present.

The description showed the embodiment of stacking a plurality of the electric elements. A certain effect is believed to be brought about even in such an embodiment that a plurality of the electric elements are not stacked in the stacked battery (embodiment of including only one single cell). However, Joule heating due to short circuits tends to increase more in the embodiment of stacking a plurality of the electric elements than in the embodiment of including one electric element. That is, it can be said that the effect of providing the short-circuit current shunt part is more outstanding in the embodiment of stacking a plurality of the electric elements. Thus, the stacked battery of the present disclosure includes a plurality of the electric elements.

In the description, the current collector tabs protrude from the short-circuit current shunt part and the electric elements. However, the stacked battery of the present disclosure does not necessarily include the current collector tabs. For example, current collector layers of large areas are used, outer edges of a plurality of the current collector layers are made to protrude in the stack of the short-circuit current shunt part and the electric elements, and a conducting material is held between the protruding current collector layers, which makes it possible to electrically connect the current collector layers with each other without the tabs provided. Alternatively, the current collector layers may be electrically connected with each other via conductor wires or the like instead of the tabs.

The description showed the stacked battery including both an electrolyte solution based battery and a solid-state battery. It is believed that the technique of the present disclosure exerts a more outstanding effect when applied to a solid-state battery where the electrolyte layer 23 is a solid electrolyte layer (especially a sulfide solid-state battery whose solid electrolyte layer contains a sulfide solid electrolyte). This also applies to the case where a nail penetration test etc. are assumed. That is, gaps in the electric elements are small and pressure applied to the electric elements is high when a nail penetrates through the electric elements in nail penetration in a solid-state battery compared to an electrolyte solution based battery. Thus, it is believed that the shunt resistance of the short-circuit current shunt part (and the shunt resistance of the electric elements) becomes low, and most current flows into the short-circuit current shunt part (and some electric elements). Moreover, as described above, in a solid-state battery, a constraint pressure to the stack tends to be high in order to try to lower the internal resistance in the electric elements. In this case, it is believed that a constraint pressure is applied in the direction of stacking the electric elements (direction from the cathode current collector layers toward the anode current collector layers), and in nail penetration, pressure by a nail and the constraint pressure are summed to apply to the electric elements, which makes it easy to contact the current collector layers to short-circuit, and makes it easy to lower the shunt resistance of the electric elements (that is, when electric elements short-circuit, a heat generation value is easy to be large). Therefore, it is believed that the effect of providing the short-circuit current shunt part to shunt a rounding current is outstanding. In contrast, a battery case of an electrolyte solution based battery is generally filled with an electrolyte solution, the layers are immersed in the electrolyte solution, and the electrolyte solution is supplied to a gap between each layer. Pressure applied by a nail in nail penetration tends to be low compared with the case of a solid-state battery. Therefore, the effect of providing the short-circuit current shunt part in an electrolyte solution based battery is believed to be relatively small compared to the case of a solid-state battery. In the case of an electrolyte solution based battery, the short-circuit current shunt part may be in contact with the electrolyte solution according to the structure of the battery. In this case, metal constituting the short-circuit current shunt part may dissolve in the electrolyte solution as ions at charge/discharge potentials of electrodes. That is, there is a case where in an electrolyte solution based battery, contact of the short-circuit current shunt part and the electrolyte solution may suppress the function of the short-circuit current shunt part. Even in this point, the technique of this disclosure is preferably used for a solid-state battery.

When the electric elements are electrically connected with each other in series using a bipolar electrode or the like, it is believed that if a nail penetrates through some electric elements, current flows via the nail from the other electric elements to some electric elements. That is, the current flows via the nail, which has a high contact resistance, and the flow thereof is small. In this point, it is believed that heat generation in the battery in internal short circuits is small and the effect of the short-circuit current shunt part is small compared with the case where the electric elements are electrically connected in parallel. Thus, in the stacked battery of this disclosure, the electric elements are preferably connected with each other electrically in parallel in view of exerting a more outstanding effect.

Structural features of the stacked battery were described above. The technique of this disclosure also has an aspect as a method for detecting heat generation inside the stacked battery. That is, the method of this disclosure is a method for detecting heat generation inside the stacked battery 100 comprising the stack 30 that comprises at least one short-circuit current shunt part 10 and a plurality of the electric elements 20 which are stacked, and the constraining member 40 that applies a constraint pressure to the stack 30. A feature of the method is electrically connecting the short-circuit current shunt part 10 to the electric elements 20, constituting the insulating layer 13 of the short-circuit current shunt part 10 of material having a predetermined melting point or glass transition temperature, contacting the first current collector layer 11 with the second current collector layer 12 to short circuit the short-circuit current shunt part 10 while melting the insulating layer 13 and changing the shape of the insulating layer 13 due to a constraint pressure by the constraining member 40 when heat is generated inside the batter due to, for example, internal short circuits of the electric elements 20 and the temperature of the battery reaches the melting point or glass transition temperature of the insulating layer 13, and passing current from the electric elements 20 through the short-circuit current shunt part 10. To measure the current flowing into the short-circuit current shunt part 10 makes it possible to easily detect heat generation inside the battery. "Method for detecting heat generation inside the battery" in this disclosure can be also called "method for discharging electric elements in internal short circuits of the battery" or "method for suppressing an temperature increase inside the battery when internal short circuits cause heat to be generated in the battery".

EXAMPLES

1. Making Short-Circuit Current Shunt Part

A short-circuit current shunt part was obtained by using aluminum foil (1N30 manufactured by UACJ Corporation, having a thickness of 15 μm) as a first current collector layer, and copper foil (manufactured by Furukawa Electric Co., Ltd., having a thickness of 14 μm) as a second current collector layer, and sandwiching one film shown in the following Table 1 between the first current collector layer and the second current collector layer as an insulating layer. In the following Table 1, ON means oriented nylon (nylon-6), PE means polyethylene, PI means a thermosetting polyimide, PEEK means polyether ether ketone, and PET means polyethylene terephthalate. In Examples 5 to 8, a two-layer film including an ON layer and a PE layer was used.

2. Evaluation of Short-Circuit Current Shunt Part

Figure 5:
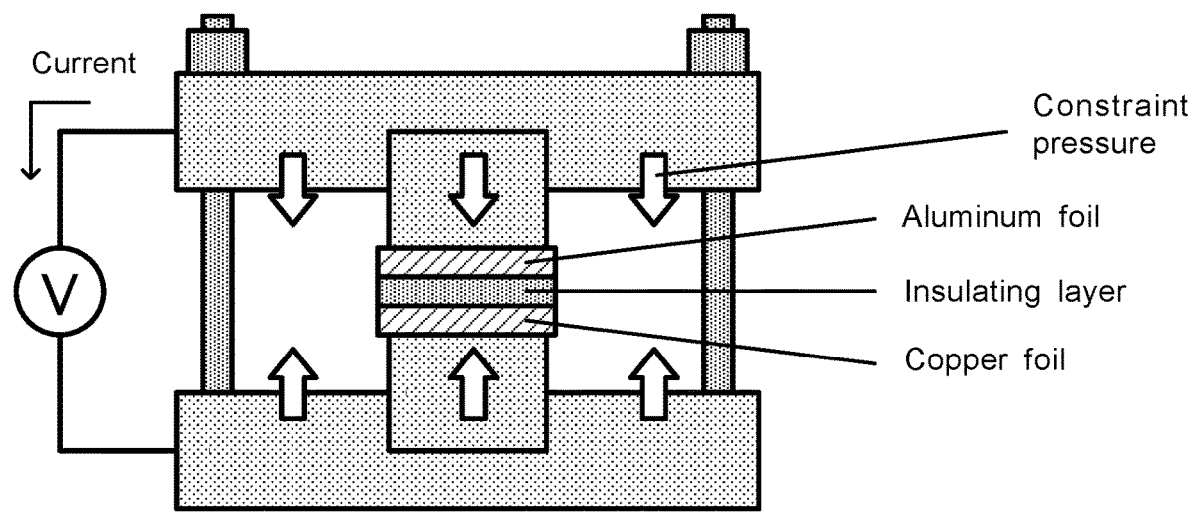
FIG. 5 is an explanatory schematic view of structure of an evaluation device used in Examples.

The relation between the resistance of the made short-circuit current shunt part, the temperature of the made short-circuit current shunt part, and a constraint pressure applied to the made short-circuit current shunt part was confirmed by using a testing device as shown in FIG. 5. Specifically, the short-circuit current shunt part was held by constraint jigs, bolts were fastened, and a predetermined constraint pressure was applied in the direction of stacking the layers of the short-circuit current shunt part. The short-circuit current shunt part was put into a constant temperature oven (manufactured by ESPEC CORP.) as constrained, and temperature was increased to 250° C. at 3° C./min in heating rate. At the same time, current of 0.1 mA ($\Delta A$) was passed for 10 seconds using a potentio/galvanostat (manufactured by Solartron Analytical), and $\Delta V$ was measured (at an interval of 30 seconds). From $\Delta V$ and $\Delta A$, the resistance R of the short-circuit current shunt part ($R=\Delta V/\Delta A$) was obtained. A temperature at which the resistance R was below 1 M$\Omega$ was recorded as "shunt starting temperature". The evaluation results are shown in the following Table 1.

TABLE 1

| | Properties of insulating layer (film) | | | | | |
|---|---|---|---|---|---|---|
| | Material | Thickness (μm) | Melting point or glass transition temp. (° C.) | Constraint pressure (MPa) | Shunt starting temp. (° C.) | Resistance after short circuits (Ω) |
| Ex. 1 | PE | 40 | 115 to 135 | 1.5 | 242 | 7 |
| Ex. 2 | PE | | | 7.5 | 216 | 3.5 |
| Ex. 3 | PE | | | 15 | 120 | 1.5 |
| Ex. 4 | PE | | | 50 | 120 | 0.5 |
| Ex. 5 | ON/PE | ON: 15 | ON: 225 | 7.5 | 230 | 1000 |
| Ex. 6 | ON/PE | PE: 60 | PE: 115 to 135 | 15 | 216 | 1000 |
| Ex. 7 | ON/PE | | | 30 | 221 | 200 |
| Ex. 8 | ON/PE | | | 50 | 223 | 200 |
| Comp. Ex. 1 | PI | 25 | None | 50 | Shunt impossible | >5M |
| Comp. Ex. 2 | PEEK | 9 | 343 | 50 | Shunt impossible | >5M |
| Comp. Ex. 3 | PET | 12 | 260 | 15 | Shunt impossible | 1.3M |

Figure 6:
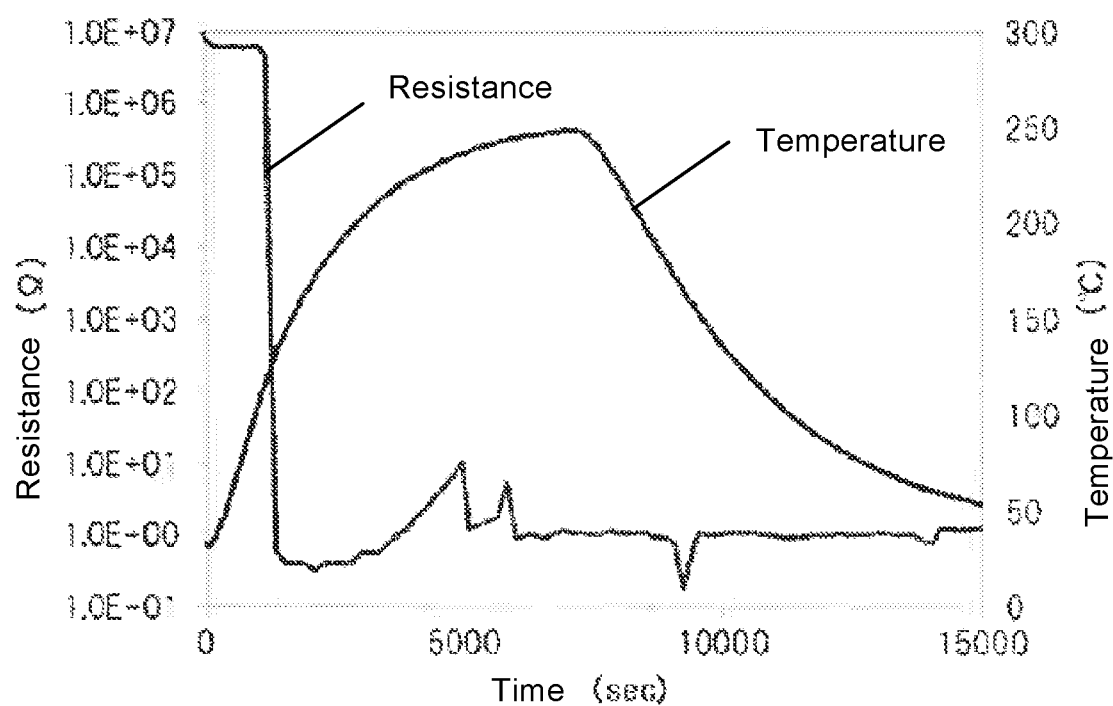
FIG. 6 shows the results according to Example 1.
Figure 7:
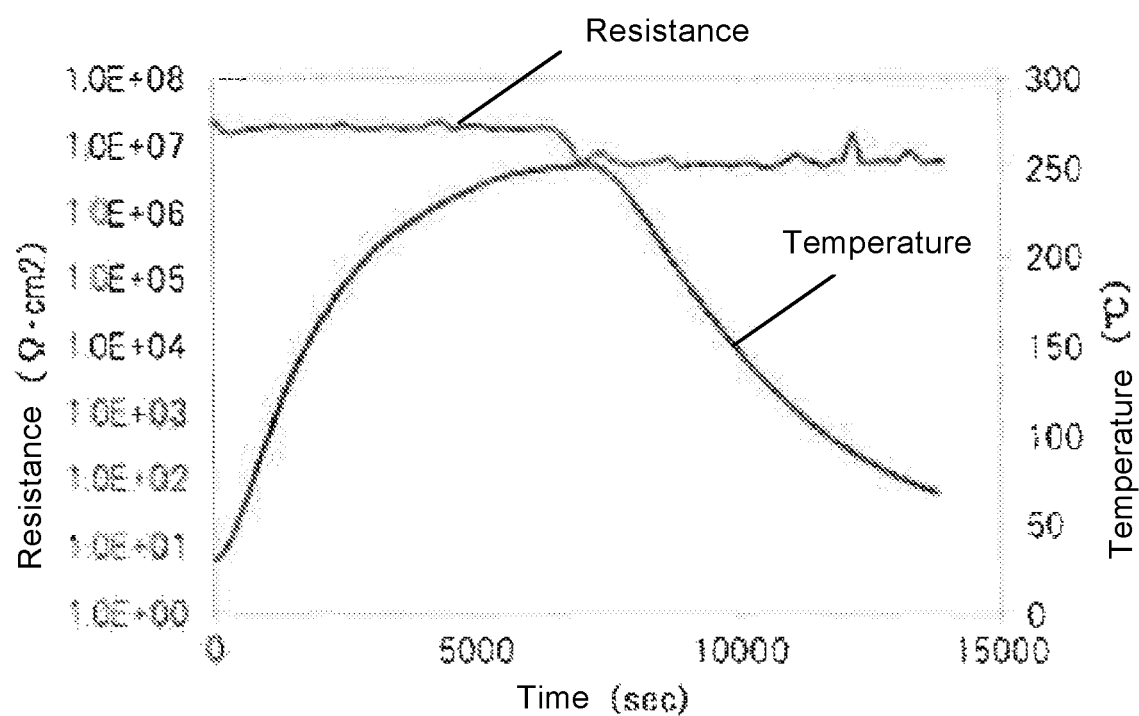
FIG. 7 shows the results according to Comparative Example 1.

FIG. 6 shows the evaluation results concerning Example 1, and FIG. 7 shows the evaluation results concerning Comparative Example 1. Further, FIG. 8 schematically shows the relation between the melting point of material constituting the insulating layer, and the resistance of the short-circuited short-circuit current shunt part.

As is apparent from the results shown in Table 1, in Examples 1 to 4 of using a polyethylene film as the insulating layer, the temperature was increased while a constraint pressure was applied, and the insulating layer was molten and the shape thereof was changed, which made it possible to properly short-circuit the short-circuit current shunt part. It was found that as shown in FIG. 6, the short-circuit current shunt part according to Example 1 was able to stably keep its short-circuiting state after short-circuited. It was also found that having the insulating layer consisting of a plurality of kinds of layers as in Examples 5 to 8 made it possible to adjust the shunt starting temperature and shunt resistance. Further, as is apparent from the results shown in Table 1, Examples 1 to 8 had a result that as a constraint pressure was high, the shunt starting temperature approached the melting point of the insulating layer more closely. It is imagined that since there is a case where a high constraint pressure is necessary for, for example, lowering the internal resistance of electric elements especially in a sulfide solid-state battery, short-circuit current shunt parts were able to be short-circuited at low temperature and low resistance when heat was generated in the battery in, for example, internal short-circuits in the battery if the short-circuit current shunt parts according to Examples 1 to 8 are combined, which makes it possible to effectively discharge the electric elements.

In contrast, when a thermosetting resin not having a melting point or glass transition temperature was used as the insulating layer like Comparative Example 1, and when one having a high melting point or glass transition temperature was used as the insulating layer like Comparative Examples 2 and 3, the insulating layer was not able to be molten and the shape thereof was not able to be changed even if a constraint pressure was applied and the temperature was increased, and the resistance of the short-circuit current shunt part remained high. It can be also seen from the results shown in FIG. 7 that the short-circuit current shunt part according to Comparative Example 1 did not short-circuit even if the temperature was increased, and kept its high resistance.

Figure 8:
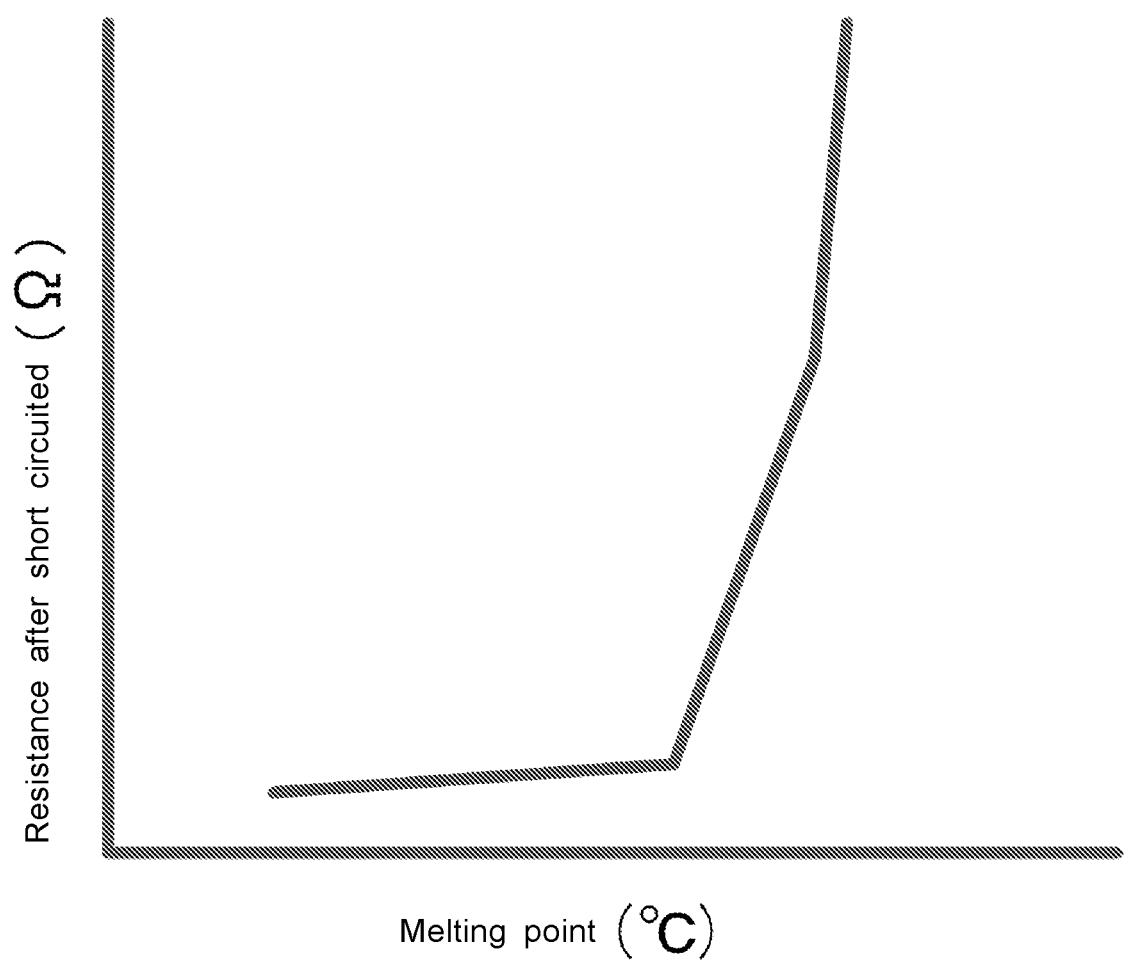
FIG. 8 is an explanatory view of the relation between a melting point (or glass transition temperature) of material constituting an insulating layer, and resistance of a short-circuited short-circuit current shunt part.

According to the tendency found by the inventors of the present application, as shown in FIG. 8, when the melting point or glass transition temperature of the insulating layer is high, the shunt resistance of the short-circuit current shunt part is hard to lower even when the temperature reaches no less than the melting point or glass transition temperature of the insulating layer. That is, it was found that material whose melting point or glass transition temperature is as low as possible is preferably employed as the insulating layer of the short-circuit current shunt part.

As described above, it was found that when the insulating layer having a predetermined melting point or glass transition temperature is used in the short-circuit current shunt part, heat is generated in the battery due to internal short circuits etc. and the temperature of the battery reaches the melting point or glass transition temperature of the insulating layer, which causes the insulating layer to melt and change its shape due to a constraint pressure, a first current collector and a second current collector to be in contact with each other, and the short-circuit current shunt part to short-circuit, and current flows from electric elements into the short-circuit current shunt part, to properly discharge the electric elements. In this case, for example, to measure the current flowing into the short-circuit current shunt part seems to make it possible to easily grasp heat generation inside the battery, and to suppress deterioration of the battery due to heat generation. In addition, electric elements are properly discharged, and thereby it can be expected to suppress excessive heat generation of the electric elements. Further, it can be expected that a case of exposing battery materials to high temperature in a high SOC state is easy to be avoided, and acceleration of a temperature increase inside the battery is suppressed.

INDUSTRIAL APPLICABILITY

The stacked battery according to this disclosure can be preferably used in a wide range of power sources such as a small-sized power source for portable devices and an onboard large-sized power source.

REFERENCE SIGNS LIST 10 short-circuit current shunt part
11 first current collector layer
11a first current collector tab
12 second current collector layer
12a second current collector tab
13 insulating layer
20a, 20b electric element
21 cathode current collector layer
21a cathode current collector tab
22 cathode material layer
23 electrolyte layer
24 anode material layer
25 anode current collector layer
25a anode current collector tab
30 stack
40 constraining member
100 stacked battery

What is claimed is:

1. A stacked battery comprising:
a stack comprising at least one short-circuit current shunt part and a plurality of electric elements which are stacked; and
a constraining member that applies a constraint pressure to the stack, wherein
the short-circuit current shunt part comprises a first current collector layer, a second current collector layer, and an insulating layer provided between the first and second current collector layers, all of these layers being stacked, the first current collector layer being electrically insulated from the second current collector layer via the insulating layer during operation of the stacked battery,
the short-circuit current shunt part is arranged on an outer side of the stack when viewed in a direction of stacking the short-circuit current shunt part and the plurality of electric elements,
each of the electric elements comprises a cathode current collector layer, a cathode material layer, an electrolyte layer, an anode material layer, and an anode current collector layer, all of these layers being stacked,
the first current collector layer is electrically connected with the cathode current collector layer,
the second current collector layer is electrically connected with the anode current collector layer,
the constraining member applies the constraint pressure at least to the short-circuit current shunt part in a direction of stacking the layers in the short-circuit current shunt part, and
a melting point or a glass transition temperature of material that constitutes the insulating layer of the short-circuit current shunt part is higher than a temperature at which the battery can be normally used, and lower than a temperature at which the battery deteriorates.

2. The stacked battery according to claim 1, wherein the battery is a sulfide solid-state battery.

3. The stacked battery according to claim 2, wherein the electrolyte layer contains $Li_2S$—$P_2S_5$—$LiI$—$LiBr$ as a sulfide solid electrolyte.

4. The stacked battery according to claim 1, wherein the constraint pressure that the constraining member applies is no less than 7.5 MPa.

5. The stacked battery according to claim 1, wherein the material that constitutes the insulating layer is polyethylene.

6. The stacked battery according to claim 1, wherein a plurality of the electric elements are electrically connected with each other in parallel.

7. The stacked battery according to claim 1, wherein the following directions are the same:
the direction of stacking the first current collector layer, the insulating layer, and the second current collector layer in the short-circuit current shunt part,
a direction of stacking the cathode current collector layer, the cathode material layer, the electrolyte layer, the anode material layer, and the anode current collector layer in each of the electric elements,
a direction of stacking the short-circuit current shunt part and the electric elements in the stack, and
a direction of applying the constraint pressure to the stack by the constraining member.

8. The stacked battery according to claim 1, wherein the melting point or the glass transition temperature of the material that constitutes the insulating layer of the short-circuit current shunt part is less than or equal to 145° C.

* * * * *